(12) United States Patent
Wu et al.

(10) Patent No.: US 12,461,754 B2
(45) Date of Patent: Nov. 4, 2025

(54) MANAGING POWER-ON AT AN INFORMATION HANDLING SYSTEM

(71) Applicant: Dell Products L.P., Round Rock, TX (US)

(72) Inventors: Li-Min Wu, Taoyuan (TW); Chen-Hsin Chang, Keelung (TW); Yaotsung Chang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 18/337,731

(22) Filed: Jun. 20, 2023

(65) Prior Publication Data

US 2024/0427607 A1 Dec. 26, 2024

(51) Int. Cl.
*G06F 1/3231* (2019.01)
*G06F 9/4401* (2018.01)

(52) U.S. Cl.
CPC .......... *G06F 9/4418* (2013.01); *G06F 1/3231* (2013.01); *G06F 9/4401* (2013.01)

(58) Field of Classification Search
CPC .... G06F 1/3206; G06F 1/3231; G06F 1/3243; G06F 1/3287; G06F 9/4401; G06F 9/4403; G06F 9/4405; G06F 9/4418
See application file for complete search history.

(56) References Cited

U.S. PATENT DOCUMENTS

| | | | | |
|---|---|---|---|---|
| 5,673,173 A * | 9/1997 | Tsai | ...................... | G06F 1/1632 361/679.43 |
| 5,689,412 A * | 11/1997 | Chen | ...................... | H02J 9/061 363/125 |
| 6,084,769 A * | 7/2000 | Moore | ..................... | G06F 1/203 361/679.52 |
| 6,457,082 B1 * | 9/2002 | Zhang | ................... | G06F 1/3296 710/266 |
| 10,572,270 B1 * | 2/2020 | Sampath | ............... | G06F 9/4406 |
| 2003/0051181 A1 * | 3/2003 | Magee | .................. | G06F 1/3231 713/320 |
| 2013/0263252 A1 * | 10/2013 | Lien | ...................... | G06F 1/3215 726/19 |
| 2013/0275738 A1 * | 10/2013 | Hung | .................... | G06F 1/3231 713/2 |

(Continued)

*Primary Examiner* — Thomas J. Cleary
(74) *Attorney, Agent, or Firm* — McDermott Will & Schulte LLP

(57) ABSTRACT

Managing power-on at an information handling system, including detecting a presence of a finger of a user of the information handling system within a threshold distance of a detection element of the information handling system; in response to detecting the presence of the finger of the user of the information handling system within the threshold distance of the detection element of the information handling system: enabling an embedded controller of the information handling system; after enabling the embedded controller, executing, by the embedded controller, a firmware load code at the information handling system; after executing the firmware load code at the information handling system, receiving user input indicating depression of a mechanical power button of the information handling system; and in response to the user input and based on execution of the firmware load code, powering-on the information handling system.

11 Claims, 7 Drawing Sheets

(56) References Cited

U.S. PATENT DOCUMENTS

| | | | |
|---|---|---|---|
| 2014/0070922 A1* | 3/2014 | Davis | H04M 11/025 |
| | | | 340/6.1 |
| 2014/0075230 A1* | 3/2014 | Suggs | G06F 1/3231 |
| | | | 713/323 |
| 2014/0195792 A1* | 7/2014 | Chew | G06F 1/3231 |
| | | | 713/2 |
| 2014/0215248 A1* | 7/2014 | Cheng | G06F 1/3234 |
| | | | 713/323 |
| 2019/0392156 A1* | 12/2019 | Garlati | G06F 12/0223 |
| 2020/0083740 A1* | 3/2020 | Sultenfuss | H02J 7/34 |
| 2020/0310527 A1* | 10/2020 | Gendler | G06F 1/3287 |
| 2020/0326767 A1* | 10/2020 | Iyer | G06F 1/3215 |
| 2020/0371664 A1* | 11/2020 | Krishnakumar | G06F 3/013 |
| 2021/0110016 A1* | 4/2021 | Kamepalli | G06K 7/06 |
| 2021/0400162 A1* | 12/2021 | Inagaki | H04N 1/00896 |
| 2022/0083345 A1* | 3/2022 | Lin | G06F 21/57 |
| 2024/0299840 A1* | 9/2024 | Huebner | A63F 13/428 |

* cited by examiner

MANAGING POWER-ON AT AN INFORMATION HANDLING SYSTEM

BACKGROUND

Field of the Disclosure

The disclosure relates generally to an information handling system, and in particular, managing power-on at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing power-on at an information handling system, including: detecting a presence of a finger of a user of the information handling system within a threshold distance of a detection element of the information handling system; in response to detecting the presence of the finger of the user of the information handling system within the threshold distance of the detection element of the information handling system: enabling an embedded controller of the information handling system; after enabling the embedded controller, executing, by the embedded controller, a firmware load code at the information handling system; after executing the firmware load code at the information handling system, receiving user input indicating depression of a mechanical power button of the information handling system; and in response to the user input and based on execution of the firmware load code, powering-on the information handling system.

Other embodiments of these aspects include corresponding systems, apparatus, and computer programs, configured to perform the actions of the methods, encoded on computer storage devices.

These and other embodiments may each optionally include one or more of the following features. For instance, in response to the user input and based on execution of the firmware load code, powering on the information handling system and executing basic input/output system (BIOS) code by a processor of the information handling system. Enabling the embedded controller of the information handling system further includes providing power to the embedded controller. The embedded controller executes the firmware load code before receiving the user input indicating the depression of the mechanical power button. The embedded controller executes the firmware load code independent of receiving the user input indicating the depression of the mechanical power button. Powering-on the information handling system includes powering-on the information handling system while operating in a direct current (DC) mode. Determining that the information handling system is in a sleep state, and in response, determining that the information handling system is in a physically open position. In response to determining that the information handling system is in the physically open position, detecting the presence of the finger of the user of the information handling system within the threshold distance of the detection element. Determining that the user input indicating the depression of the mechanical power button is within a time threshold of detecting the presence of the finger of the user of the information handling system within the threshold distance of the detection element, and in response and based on execution of the firmware load code, powering-on the information handling system. Determining that the user input indicating the depression of the mechanical power button is greater than a time threshold of detecting the presence of the finger of the user of the information handling system within the threshold distance of the detection element, and in response, disable the embedded controller of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
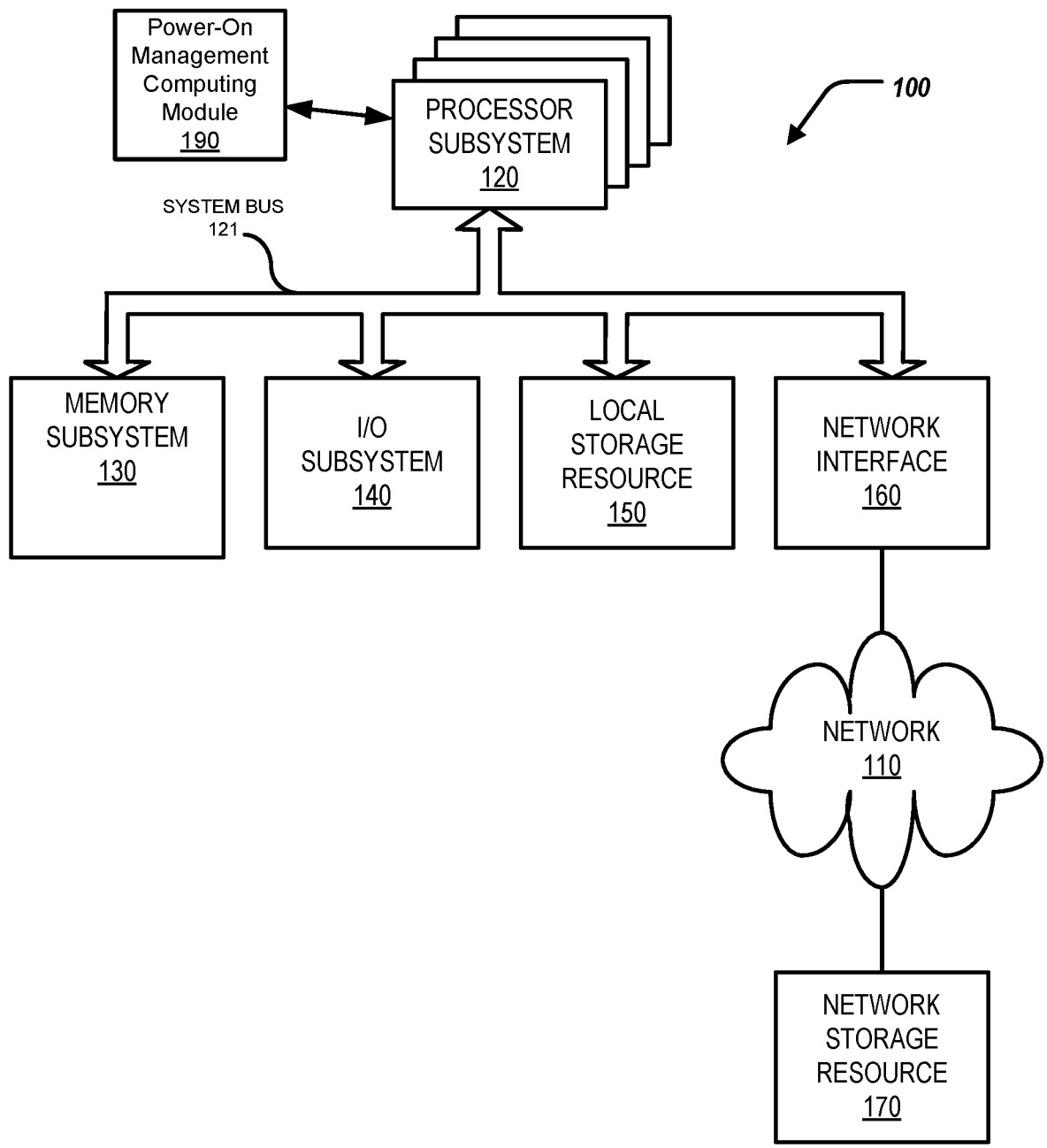
FIG. 1 is a block diagram of selected elements of an embodiment of an information handling system.

This disclosure discusses methods and systems for managing power-on at an information handling system. In short, a firmware load code at the information handling system can be completed prior to depression of a power button to decrease a booting time of the information handling system in a direct current (DC)/battery only mode. A detection element can detect a proximity of a finger of a user to the power button, and upon such detection, initialize the firmware load code prior to the user fulling depressing the power button.

Specifically, this disclosure discusses a system and a method for managing power-on at an information handling system, including detecting a presence of a finger of a user of the information handling system within a threshold distance of a detection element of the information handling system; in response to detecting the presence of the finger of the user of the information handling system within the threshold distance of the detection element of the information handling system: enabling an embedded controller of the information handling system; after enabling the embedded controller, executing, by the embedded controller, a firmware load code at the information handling system; after executing the firmware load code at the information handling system, receiving user input indicating depression of a mechanical power button of the information handling system; and in response to the user input and based on execution of the firmware load code, powering-on the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a power-on management computing module 190. The power-on management computing module 190 can be included by the processor subsystem 120, or in communication with the processor subsystem 120.

Figure 2:
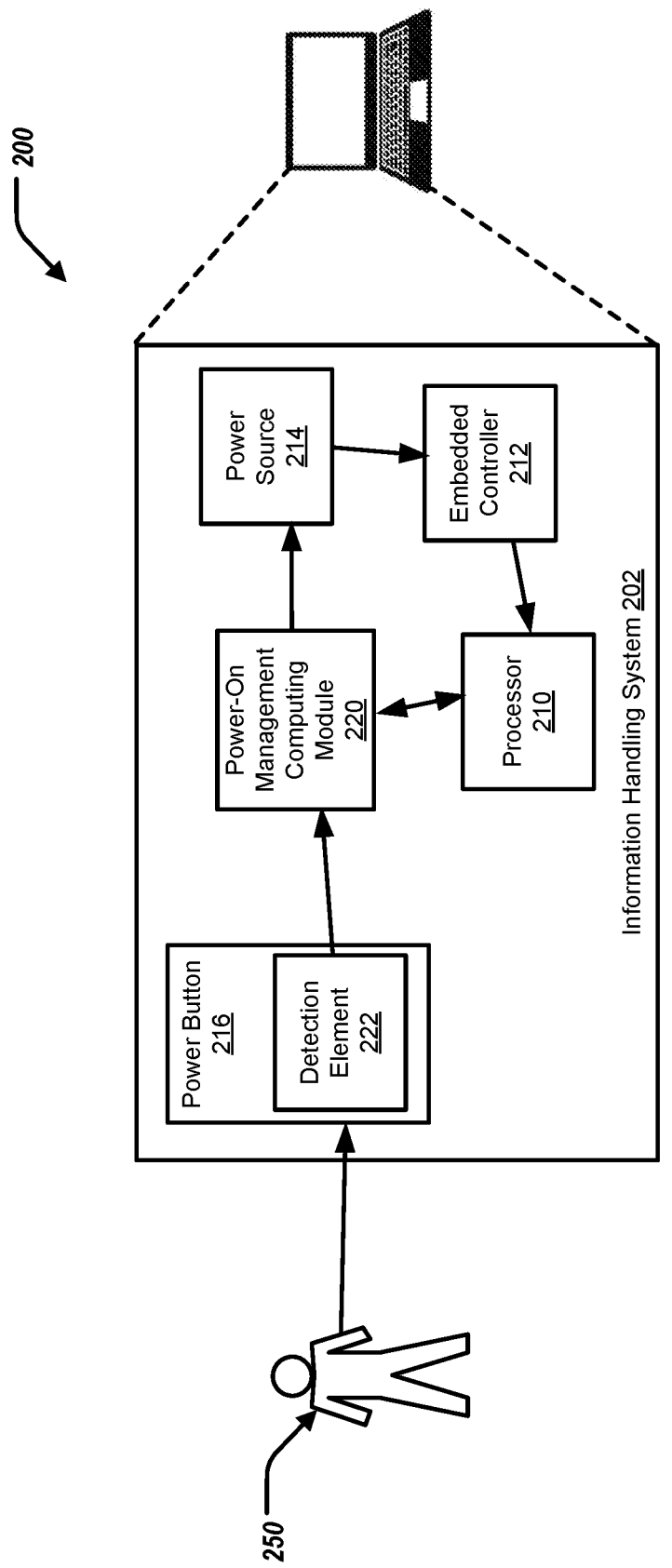
FIG. 2 illustrates a block diagram of an information handling system.

Turning to FIG. 2, FIG. 2 illustrates an environment 200 including an information handling system 202. The information handling system 202 can include a processor 210, an embedded controller 212, a power source 214, a power button 216, and a power-on management computing module 220. In some examples, the information handling system 202 is similar to, or includes, the information handling system 100 of FIG. 1. In some examples, the power-on management computing module 220 is similar to, or includes, the power-on management computing module 190 of FIG. 1. In some examples, the processor 210 is similar to, or includes, the processor subsystem 120 of FIG. 1.

The power button can include a detection element 222.

The power-on management computing module 220 can be in communication with the power button 216 and the power source 214. The power source 214 can be in communication with the power-on management computing module 220 and the embedded controller 212. The embedded controller 212 can be in communication with the power source 214 and the processor 210. The processor 210 can be in communication with the embedded controller 212. The power-on management computing module 220 can be in communication with the processor 210.

A user 250 can interact with the information handling system 202, including interacting with the power button 216.

Figure 3A:
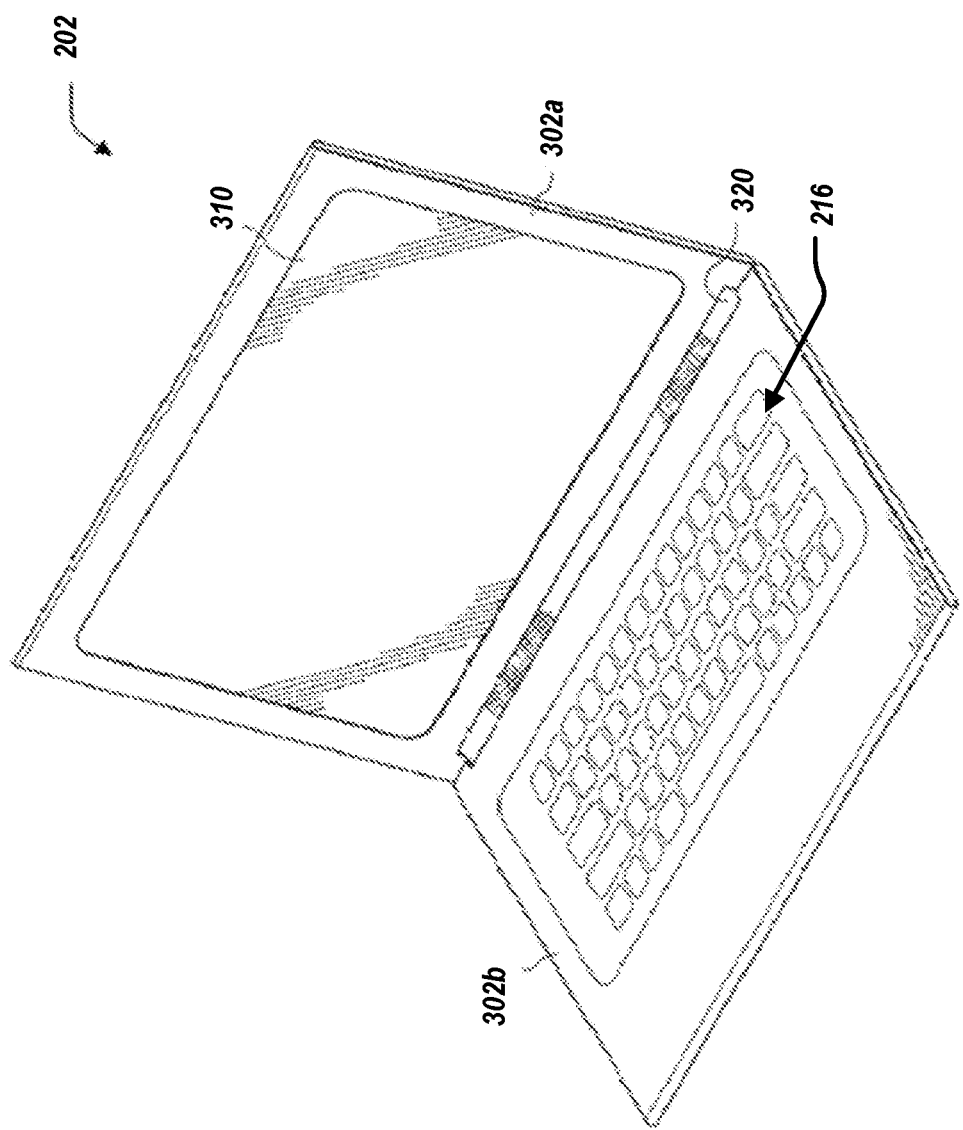
FIG. 3A illustrates a perspective view of the information handling system in an open state.

Turning to FIG. 3A, FIG. 3A illustrates a perspective view of the information handling system 202, in an open state. The information handling system 202 can include a first body 302a and a second body 302b (collectively referred to as bodies 302). The first body 302a can include a display 310. A hinge 320 can couple the first body 302a to the second body 320b. The information handling system 202 can include the power button 216. In some examples, the information handling system 202 is similar to, or includes, the information handling system 100 of FIG. 1. When the information handling system 202 is in the open state, the first body 302a is rotated with respect to the second body 302b about the hinge 320 to define an angle between the first body 302a and the second body 302b.

Figure 3B:
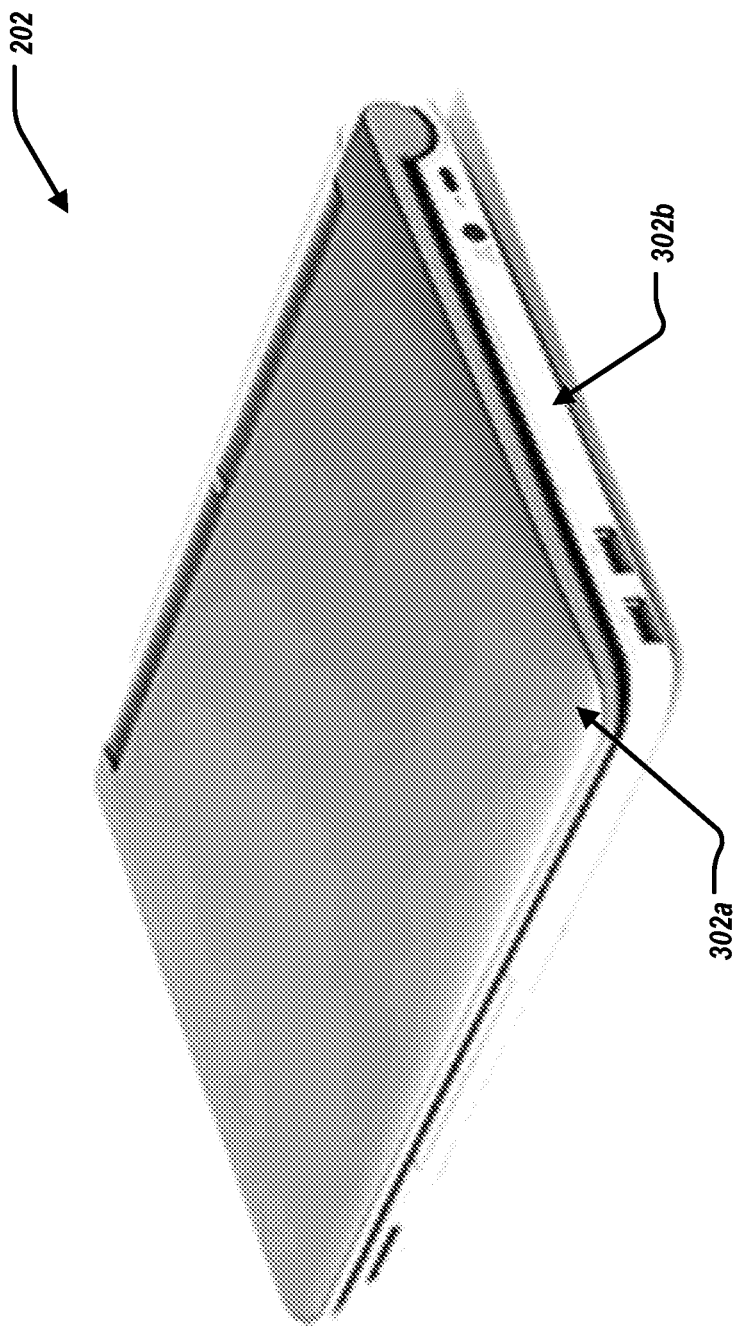
FIG. 3B illustrates a perspective view of the information handling system in a closed state.

FIG. 3B illustrates a perspective view of the information handling system 202, in a closed state. When the information handling system 202 is in the closed state, the first body 302a is adjacent to the second body 302b such that there is a zero degree angle between the first body 302a and the second body 302b.

In short, a firmware load code at the information handling system 202 can be completed prior to depression of the power button 216 to decrease a booting time of the information handling system 202 in a DC/battery only mode. The detection element 222 can detect a proximity of a finger of the user 250 to the power button 216, and upon such detection, initialize the firmware load code prior to the user fulling depressing the power button 216.

Figure 4:
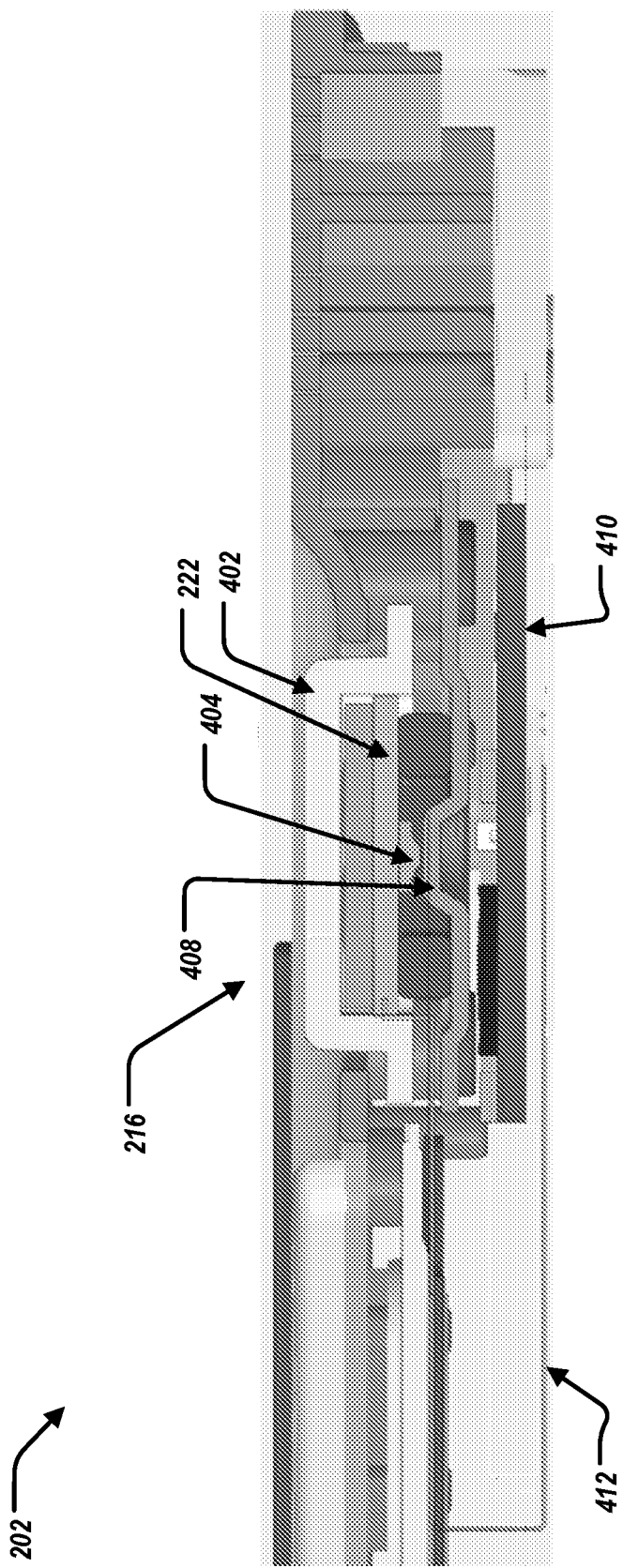
FIG. 4 illustrates a side cut-away view of the information handling system and the power button.

FIG. 4 illustrates a side cutaway view of a portion of the information handling system 202, including a side cutaway view of the power button 216. The power button 216 can include a power button cap 402 and a trigger 404. The trigger 404 is configured to mechanically contact a body 408 to indicate adjusting the power state of the information handling system 202 (e.g., from an on-power state to an off-power state, and from an off-power state to an on-power state; or between any of states S0 to S5).

The power button 216 can further include the detection element 222. The detection element 222 can facilitate detection of a proximity of the user 250 to the power button 216, including a proximity of a finger of the user 250 to the power button 216. For example, the detection element 222 can detect whether the finger of the user 250 is within a threshold distance of the power button 216, and specifically, a threshold distance of the detection element 406. For example, the threshold distance can be 1 millimeter, 2 millimeters, or 3 millimeters.

The detection element 222 can be positioned between the power button cap 402 and the trigger 404. That is, the detection element 222 is positioned proximate to the power button cap 402. That is, the detection element 222 is integrated within the power button 216. The detection element 222 can be connected to (coupled with) a motherboard (printed circuit board) 410 of the information handling system 202 by a flexible printed circuit (board) cable 412.

In some examples, the detection element 222 is a capacitive sensor. In some examples, the detection element 222 is a fingerprint detector or a proximity detector of a human finger.

Figure 5:
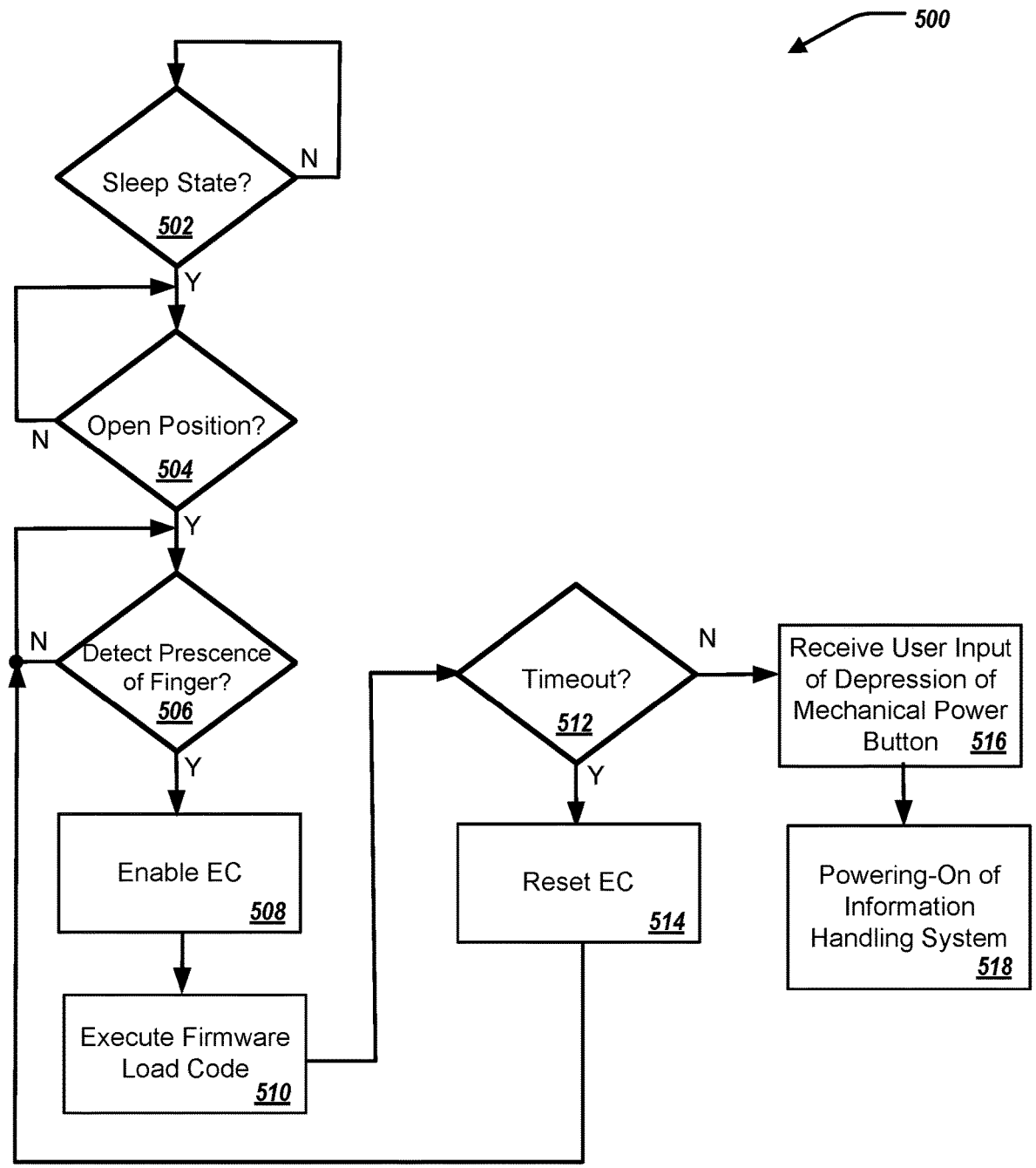
FIG. 5 illustrates a method for managing power-on at the information handling system.

FIG. 5 illustrates a flowchart depicting selected elements of an embodiment of a method 500 for managing power-on at an information handling system in DC mode. The method 500 may be performed by the information handling system 100 and/or the information handling system 202, and with reference to FIGS. 1-4 and 6. It is noted that certain operations described in method 500 may be optional or may be rearranged in different embodiments.

The power-on management computing module 220 determines whether the information handling system 202 is in a sleep state, at 502. For example, the power-on management computing module 220 can determine whether the information handling system 202 is in a S1-S4 state.

In some examples, the power-on management computing module 220 determines that the information handling system 202 is in a sleep state (at 502), and in response, determines whether the information handling system 202 is in a physically open position, at 504. For example, the power-on management computing module 220 determines that the information handling system 202 is in a S1-S4 state, and in response, determines whether the information handling system 202 is in a physically open position. The physically open position of the information handling system 202 can include the first body 302a at an angle with respect to the second body 302b, as shown in FIG. 3A. For example, the power-on management computing module 220 determines that the information handling system 202 is in a table-top position, as shown in FIG. 3A.

In some examples, the power-on management computing module 220 determines that the information handling system 202 is in the physically open position (at 504), and in response, the detection element 222 detects whether there is a presence of the finger of the user 250 within the threshold distance of the detection element 222, at 506. For example, the detection element 222 detects whether the finger of the user 250 is within 1 millimeter (or 2 millimeters) of the detection element 222.

In some examples, the detection element 222 detects the presence of the finger of the user 250 within the threshold distance of the detection element 222 (at 506), and in response, provides a signal indicating such to the power-on management computing module 220.

Figure 6:
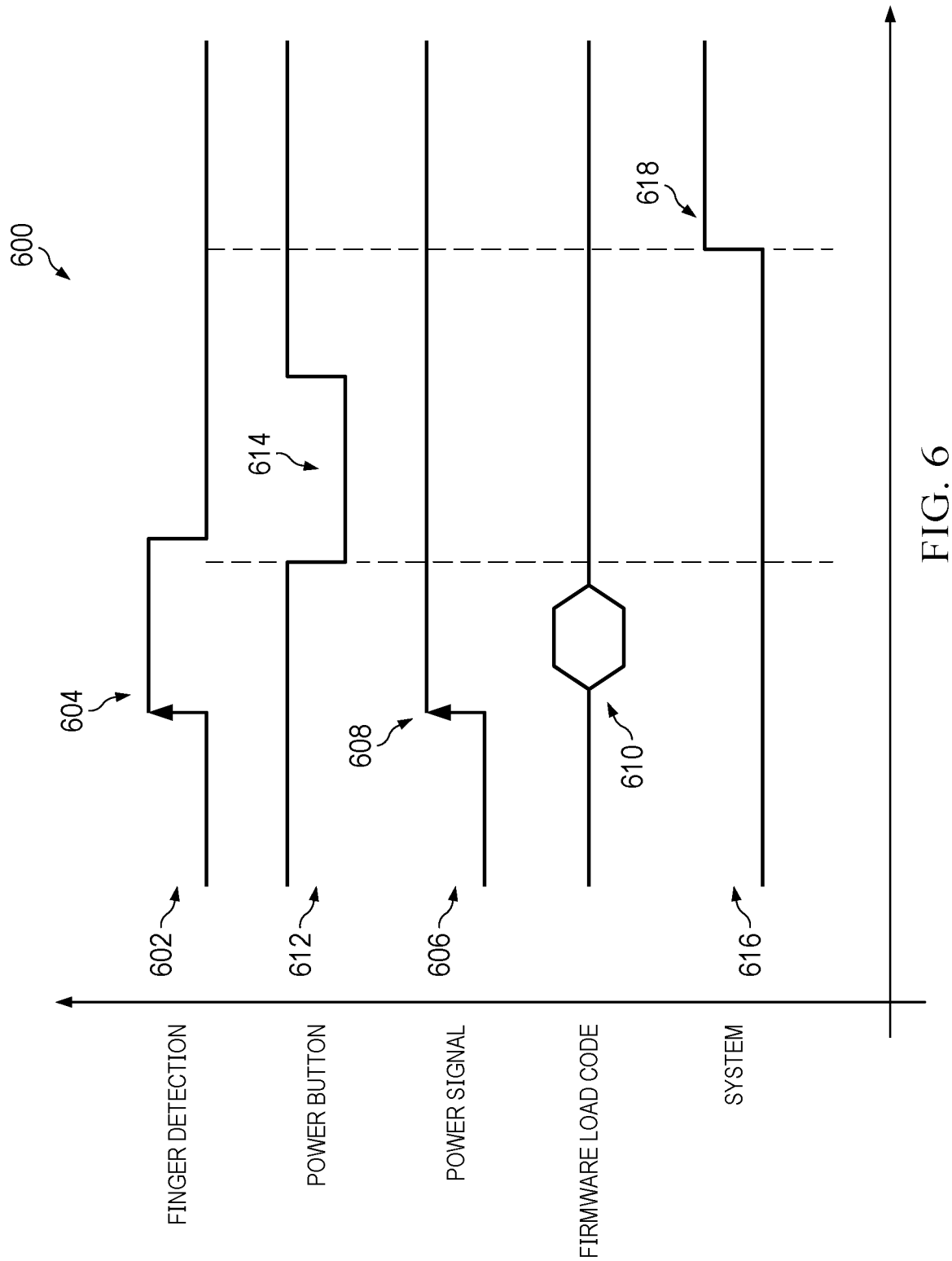
FIG. 6 illustrates a timing diagram of signals related to the powering-on of the information handling system.

Specifically, FIG. 6 illustrates a timing diagram 600 indicating signals associated with powering-on the information handling system 202. When the detection element 222 detects the presence of the finger of the user 250 with the threshold distance of the detection element 222, a signal 602 indicating such detection goes from low to high, at point 604.

The power-on management computing module 220 can then, in turn, enable the embedded controller 212, at 508. Specifically, the power-on management computing module 220 can enable the power source 214 to provide power to the embedded controller 212 (EC 212). The power source 214 provides power to the embedded controller 212, and thus, enabling the embedded controller 212. Referring again to FIG. 6, a power signal 606 provided by the power source 214 goes from low to high, at point 608, shortly after the signal 602 indicating the detection of the presence of the finger of the user 250 goes from low to high, at point 604. In some examples, the power source 214 provides a 3.3 voltage power signal to the embedded controller 212.

Further, when the detection element 222 detects the presence of the finger of the user 250 within the threshold distance of the detection element 222 (at 506), the embedded controller 212, after being enabled, executes a firmware load code at the information handling system 202, at 510. That is, the embedded controller 212 communicates with the processor 210 to execute a firmware load code at the information handling system 202 for initialization of the information handling system 202. That is, the embedded controller 212 communicates with the processor 210 to execute a firmware load code at the information handling system 202 for EC/ME load code at the information handling system 202. Referring again to FIG. 6, the firmware load code is performed at 610, shortly after the power signal is goes high at point 608.

In some examples, the embedded controller 212 executes the firmware load code before (prior to) receiving any additional user input, such as user input indicating a pressing or depressing of the mechanical power button 216. That is, the embedded controller 212 executes the firmware load code based on (or in response to) the detection element 222 detecting the presence of the finger of the user 250 within the threshold distance of the detection element 222. In some example, the embedded controller 212 executes the firmware load code independent of receiving any additional user input, such as user input indicating a pressing or depressing of the mechanical power button 216. That is, the embedded controller 212 executes the firmware load code based on (or in response to) the detection element 222 detecting the presence of the finger of the user 250 within the threshold distance of the detection element 222, and independent of further user input such as a pressing or depressing of the mechanical power button 216.

The power-on management computing module 220 determines whether a timeout has occurred, at 512. That is, the power-on management computing module 220 determines whether a threshold amount of time has passed without receiving additional user input (e.g., pressing/depressing of the mechanical power button 216 within threshold amount of time). Specifically, the power-on management computing module 220 determines whether a threshold amount of time has passed from detecting the presence of the finger of the user 250 within the threshold distance of the detection element 222 without receiving additional user input. For example, the threshold amount of time is 2 seconds. For example, the threshold amount of time is 5 seconds.

In some examples, the power-on management computing module 220 receives user input indicating depression of the power button 216, at 516. That is, the power-on management computing module 220 receives the user input indicating the depression of the power button 216 within the threshold amount of time (at 512)—a timeout did not occur. Specifically, the power-on management computing module 220 receives the user input indicating the depression of the power button 216 within the threshold amount of time from detecting the presence of the finger of the user 250 within the threshold distance of the detection element 222.

The power button 216 can provide a signal to the power-on management computing module 220 indicating such user input of the depression of the power button 216. Referring again to FIG. 6, a power button signal 612 adjust states at point 614 indicating the user input of the depression of the power button 216.

Additionally, the power-on management computing module 220 receives user input indicating depression of the power button 216 (at 516) after executing the firmware load code (at 510). Referring back to FIG. 6, the firmware load code, performed at 610, occurs prior to the power button signal 612 adjusting states at point 614 indicating the user input of the depression of the power button 216. In other words, the firmware load code, by the embedded controller 212, occurs prior to depression of the power button 216.

Moreover, the embedded controller 212 executes the firmware load code (at 510) before (prior to) receiving the user input indicating a pressing or depressing of the mechanical power button 216 (at 516). That is, the embedded controller 212 executes the firmware load code (at 510) independent of receiving the user input indicating a pressing or depressing of the mechanical power button 216 (at 516). That is, the embedded controller 212 executes the firmware load code (at 510) based on (or in response to) the detection element 222 detecting the presence of the finger of the user 250 within the threshold distance of the detection element 222, and independent of the user input indicating a pressing or depressing of the mechanical power button 216 (at 516).

The power-on management computing module 220, in response to the user input indicating the indicating depression of the power button 216 (at 516) and based on the execution of the firmware load code (at 510), powers-on the information handling system 202, at 518. Specifically, the processor 210 can begin execution of basic input/output system (BIOS) code. Referring back to FIG. 6, the information handling system 202 is placed in an "on state" indicated by signal 616 and at point 618.

In some examples, the method 500 is performed while the information handling system 200 is in a direct current (DC) mode (DC/battery only mode). That is, the information handling system 202 is powered-on while operating in DC mode/battery only mode.

In some examples, the power-on management computing module 220 does not receive additional user input within the threshold amount of time (at 512), and the in response, the power-on management computing module 220 disables (or resets) the embedded controller 212 (EC 212), at 514. That is, the power-on management computing module 220 does not receive any additional input—e.g., the user input indicating the depression of the power button 216, within the threshold amount of time from detecting the presence of the finger of the user 250 within the threshold distance of the detection element 222. In response to such, the power-on management computing module 220 disables (or resets) the embedded controller 212. The process then proceeds to step 506.

In some examples, the power-on management computing module 220 determines that the information handling system 202 is not in a sleep state (at 502), and in response, proceeds back to step 502.

In some examples, the power-on management computing module 220 determines that the information handling system 202 is not in the physically open position (at 504), and in response, proceeds back to step 504. For example, the power-on management computing module 220 determines that the information handling system 202 is in a closed position, as shown at FIG. 3B.

In some examples, the detection element 222 does not detect the presence of the finger of the user 250 within the threshold distance of the detection element 222 (at 506), and in response, returns to step 506.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing power-on at an information handling system, including:
   determining that the information handling system is in a sleep state;
   in response to determining that the information handling system is in the sleep state, detecting, at a first time, whether there is a presence of a finger of a user of the information handling system within a threshold distance of a detection element integrated within a mechanical power button of the information handling system;

in response to detecting, at the first time, the presence of the finger of the user of the information handling system within the threshold distance of the detection element of the information handling system:
  enabling an embedded controller of the information handling system;
  after enabling the embedded controller, executing, by the embedded controller, a firmware load code at the information handling system;
  after executing the firmware load code at the information handling system, receiving user input indicating depression of the mechanical power button of the information handling system;
  in response to receiving the user input indicating the depression of the mechanical power button of the information handling system:
    determining that the user input indicating the depression of the mechanical power button is greater than a time threshold of detecting, at the first time, the presence of the finger of the user of the information handling system within the threshold distance of the detection element, and in response:
      resetting the embedded controller; and
      after resetting the embedded controller, detecting, at a second time after the first time, whether there is a presence of the finger of the user of the information handling system within the threshold distance of the detection element integrated within the mechanical power button of the information handling system;
      in response to detecting, at the second time, the presence of the finger of the user of the information handling system within the threshold distance of the detection element of the information handling system:
        re-enabling the embedded controller of the information handling system;
        after re-enabling the embedded controller, re-executing, by the embedded controller, the firmware load code at the information handling system;
        after re-executing the firmware load code at the information handling system, receiving additional user input indicating depression of the mechanical power button of the information handling system;
        in response to the additional user input and based on re-execution of the firmware load code, powering-on the information handling system,
      wherein the firmware load code executes prior to depression of the mechanical power button.

2. The computer-implemented method of claim 1, wherein in response to the user input and based on execution of the firmware load code, powering on the information handling system and executing basic input/output system (BIOS) code by a processor of the information handling system.

3. The computer-implemented method of claim 1, wherein enabling the embedded controller of the information handling system further includes providing power to the embedded controller.

4. The computer-implemented method of claim 1, wherein powering-on the information handling system includes powering-on the information handling system while operating in a direct current (DC) mode.

5. The computer-implemented method of claim 1, further including:
  determining that the user input indicating the depression of the mechanical power button is within the time threshold of detecting, at the first time, the presence of the finger of the user of the information handling system within the threshold distance of the detection element, and in response and based on execution of the firmware load code, powering-on the information handling system.

6. An information handling system comprising a processor having access to memory media storing instructions executable by the processor to perform operations, comprising:
  determining that the information handling system is in a sleep state;
  in response to determining that the information handling system is in the sleep state, detecting, at a first time, whether there is a presence of a finger of a user of the information handling system within a threshold distance of a detection element integrated within a mechanical power button of the information handling system;
  in response to detecting, at the first time, the presence of the finger of the user of the information handling system within the threshold distance of the detection element of the information handling system:
    enabling an embedded controller of the information handling system;
    after enabling the embedded controller, executing, by the embedded controller, a firmware load code at the information handling system;
    after executing the firmware load code at the information handling system, receiving user input indicating depression of the mechanical power button of the information handling system;
    in response to receiving the user input indicating the depression of the mechanical power button of the information handling system:
      determining that the user input indicating the depression of the mechanical power button is greater than a time threshold of detecting, at the first time, the presence of the finger of the user of the information handling system within the threshold distance of the detection element, and in response:
        resetting the embedded controller; and
        after resetting the embedded controller, detecting, at a second time after the first time, whether there is a presence of the finger of the user of the information handling system within the threshold distance of the detection element integrated within the mechanical power button of the information handling system;
        in response to detecting, at the second time, the presence of the finger of the user of the information handling system within the threshold distance of the detection element of the information handling system:
          re-enabling the embedded controller of the information handling system;
          after re-enabling the embedded controller, re-executing, by the embedded controller, the firmware load code at the information handling system;
          after re-executing the firmware load code at the information handling system, receiving additional user input indicating depression of the mechanical power button of the information handling system;

in response to the additional user input and based on re-execution of the firmware load code, powering-on the information handling system, wherein the firmware load code executes prior to depression of the mechanical power button.

7. The information handling system of claim 6, wherein in response to the user input and based on execution of the firmware load code, powering on the information handling system and executing basic input/output system (BIOS) code by the processor of the information handling system.

8. The information handling system of claim 6, wherein enabling the embedded controller of the information handling system further includes providing power to the embedded controller.

9. The information handling system of claim 6, wherein powering-on the information handling system includes powering-on the information handling system while operating in a direct current (DC) mode.

10. The information handling system of claim 6, the operations further including:

determining that the user input indicating the depression of the mechanical power button is within the time threshold of detecting, at the first time, the presence of the finger of the user of the information handling system within the threshold distance of the detection element, and in response and based on execution of the firmware load code, powering-on the information handling system.

11. A non-transitory computer-readable medium storing software comprising instructions executable by one or more computers which, upon such execution, cause the one or more computers to perform operations comprising:

determining that the information handling system is in a sleep state;

in response to determining that the information handling system is in the sleep state, detecting, at a first time, whether there is a presence of a finger of a user of the information handling system within a threshold distance of a detection element integrated within a mechanical power button of the information handling system;

in response to detecting, at the first time, the presence of the finger of the user of the information handling system within the threshold distance of the detection element of the information handling system:

enabling an embedded controller of the information handling system;

after enabling the embedded controller, executing, by the embedded controller, a firmware load code at the information handling system;

after executing the firmware load code at the information handling system, receiving user input indicating depression of the mechanical power button of the information handling system;

in response to receiving the user input indicating the depression of the mechanical power button of the information handling system:

determining that the user input indicating the depression of the mechanical power button is greater than a time threshold of detecting, at the first time, the presence of the finger of the user of the information handling system within the threshold distance of the detection element, and in response:

resetting the embedded controller; and after resetting the embedded controller, detecting, at a second time after the first time, whether there is a presence of the finger of the user of the information handling system within the threshold distance of the detection element integrated within the mechanical power button of the information handling system;

in response to detecting, at the second time, the presence of the finger of the user of the information handling system within the threshold distance of the detection element of the information handling system:

re-enabling the embedded controller of the information handling system;

after re-enabling the embedded controller, re-executing, by the embedded controller, the firmware load code at the information handling system;

after re-executing the firmware load code at the information handling system, receiving additional user input indicating depression of the mechanical power button of the information handling system;

in response to the additional user input and based on re-execution of the firmware load code, powering-on the information handling system, wherein the firmware load code executes prior to depression of the mechanical power button.

* * * * *